US012071197B2

(12) United States Patent
Zhu et al.

(10) Patent No.: US 12,071,197 B2
(45) Date of Patent: Aug. 27, 2024

(54) TOY VEHICLE FOR CHILDREN

(71) Applicant: GOODBABY CHILD PRODUCTS CO., LTD., Jiangsu (CN)

(72) Inventors: Tiewen Zhu, Jiangsu (CN); Lianlei Ding, Jiangsu (CN)

(73) Assignee: GOODBABY CHILD PRODUCTS CO., LTD., Jiangsu (CN)

(*) Notice: Subject to any disclaimer, the term of this patent is extended or adjusted under 35 U.S.C. 154(b) by 583 days.

(21) Appl. No.: 17/309,496

(22) PCT Filed: Dec. 18, 2018

(86) PCT No.: PCT/CN2018/121628
§ 371 (c)(1),
(2) Date: Jun. 1, 2021

(87) PCT Pub. No.: WO2020/118737
PCT Pub. Date: Jun. 18, 2020

(65) Prior Publication Data
US 2022/0063752 A1 Mar. 3, 2022

(30) Foreign Application Priority Data
Dec. 13, 2018 (CN) .......................... 201811522188.0

(51) Int. Cl.
*B62M 1/20* (2006.01)
*B62K 9/02* (2006.01)
(Continued)

(52) U.S. Cl.
CPC ................. *B62M 1/20* (2013.01); *B62K 9/02* (2013.01); *B62M 1/14* (2013.01); *B62M 1/16* (2013.01); *B62M 1/18* (2013.01)

(58) Field of Classification Search
CPC .. B62K 9/00; B62K 9/02; B62M 1/16; B62M 1/18; B62M 1/20
See application file for complete search history.

(56) References Cited

U.S. PATENT DOCUMENTS 2,216,982 A * 10/1940 Ollagnon ................. B62M 1/14
280/242.1
4,076,269 A * 2/1978 Muguruma .............. B62K 5/00
280/282
(Continued)

FOREIGN PATENT DOCUMENTS

CN 102285416 A 12/2011
CN 102285417 A 12/2011
(Continued)

OTHER PUBLICATIONS

International Search Report and Written Opinion for International Patent Application No. PCT/CN2018/121628, dated Jul. 26, 2019 in 9 pages.

*Primary Examiner* — Kevin Hurley
*Assistant Examiner* — Hosam Shabara
(74) *Attorney, Agent, or Firm* — MUNCY, GEISSLER, OLDS & LOWE, P.C.

(57) ABSTRACT

A toy vehicle for children, comprising a vehicle frame, a steering rod, and a front wheel component provided at the bottom of the steering rod. The vehicle frame comprises a main vehicle frame provided with a seat mechanism, a left side frame with a left rear wheel assembly, and a right frame with a right rear wheel assembly. The left side frame and the right side frame respectively are rotatably connected to the rear of the main vehicle frame. The vehicle frame is further provided with a driving mechanism used for driving the left side frame and the right side frame to rotate respectively relative to the main vehicle frame so as to allow the left rear wheel assembly and the right rear wheel assembly to approach or to move away from each other, and an operating mechanism used for driving the movement of the driving mechanism.

20 Claims, 12 Drawing Sheets

(51) Int. Cl.
    *B62M 1/14*     (2006.01)
    *B62M 1/16*     (2006.01)
    *B62M 1/18*     (2006.01)

(56)          References Cited

U.S. PATENT DOCUMENTS

2002/0180177 A1    12/2002  Chen et al.
2008/0001374 A1*    1/2008  Liao .................... B62K 9/02
                                                        280/62
2011/0089656 A1*    4/2011  Chiu .................... B62M 1/20
                                                       280/87.041
2013/0140787 A1*    6/2013  Ko ..................... B62M 1/18
                                                        280/221
2014/0117641 A1     5/2014  Hsin et al.
2017/0029061 A1     2/2017  Smart et al.

FOREIGN PATENT DOCUMENTS

CN          202703797 U       1/2013
CN          102935872 A       2/2013
CN          105000121 A      10/2015
CN          204713340 U      10/2015
CN          105015638 A      11/2015
CN          105015668 A      11/2015
CN          105480364 A       4/2016
CN          206384094 U       8/2017
CN          206734526 U      12/2017
CN          107651074 A       2/2018
CN          209719801 U      12/2019
EP            2075183 A1      7/2009
EP            2075183 B1      3/2013
JP           52049141 A       4/1977

* cited by examiner

TOY VEHICLE FOR CHILDREN

CROSS-REFERENCE TO RELATED APPLICATIONS

This application claims priority to PCT Application No. PCT/CN2018/121628, having a filing date of Dec. 18, 2018, the entire contents both of which are hereby incorporated by reference and which is based on Chinese Application No. 201811522188.0, having a filing date of Dec. 13, 2018.

FIELD OF TECHNOLOGY

The following relates to a toy vehicle for children.

BACKGROUND

A breaststroke vehicle, also known as a dragon scooter and a scissor vehicle, is a common toy vehicle for children. Its principle is to drive two rear wheel sets at the rear lower portion to move away from each other and close to each other by constantly swinging two supports at the rear portion, thereby the breaststroke vehicle is driven to move. However, most of the breaststroke vehicles on the market require user to stand and drive the two supports to swing, which cannot be driven in a sitting position, and has certain limitations in use.

SUMMARY

The purpose of the present disclosure is to provide a toy vehicle for children with a new style of play, and a user can exercise limbs while using the toy vehicle.

To achieve the above purpose, the technical solution provided by the present disclosure is: A toy vehicle for children, comprising a vehicle frame, a steering rod arranged at the front of the vehicle frame and extending in an up-and-down direction, and a front wheel assembly arranged at the bottom of the steering rod, wherein the vehicle frame comprises a main vehicle frame provided with a seat mechanism, a left side frame provided with a left rear wheel assembly at the rear thereof, and a right side frame provided with a right rear wheel assembly at the rear thereof; the left side frame and the right side frame are respectively rotatably connected to the rear of the main vehicle frame, and the left rear wheel assembly and the right rear wheel assembly are both universal wheels; and the vehicle frame is further provided with a driving mechanism thereon used for driving the left side frame and the right side frame to rotate respectively relative to the main vehicle frame so that the left rear wheel assembly and the right rear wheel assembly are relatively close to each other or away from each other, and an operating mechanism used for driving the driving mechanism to work.

Further, the driving mechanism at least comprises a sliding member arranged on the main vehicle frame in a manner of being capable of sliding in a front-and-rear direction, and the left rear wheel assembly and the right rear wheel assembly are driven to be close to each other or away from each other when the sliding member slides in the front-and-rear direction.

Further, the sliding member and the left rear wheel assembly, and/or the sliding member and the right rear wheel assembly are fit and connected via a tooth meshing transmission structure.

Further, the tooth meshing transmission structure comprises a first group of teeth and a second group of teeth, and the first group of teeth comprises a plurality of first teeth distributed on the sliding member along the front-and-rear direction; the second group of teeth comprises a plurality of second teeth arranged along an arc line, and the arc line on which all of the second teeth are distributed takes a center line around which the left side frame or the right side frame are rotated relative to the main vehicle frame as a rotatory center line; the left side frame and the right side frame are respectively arranged on the left and right sides of the sliding member; the front portions of the left side frame and of the right side frame are both provided with the second group of teeth, the left and right sides of the sliding member are respectively provided with one first group of teeth, and the first group of teeth on each side meshes with the second group of teeth on corresponding side.

Further, the left side frame comprises a left leg extending along the front-and-rear direction, and a left connecting portion fixedly arranged at front end portion of the left leg, wherein the left connecting portion is in a sector shape and pivotally connected to the rear of the main vehicle frame, and the second group of teeth is arranged on the left connecting portion, and the left rear wheel assembly is arranged at the bottom rear portion of the left leg; the right side frame comprises a right leg extending along the front-and-rear direction, and a right connecting portion fixedly arranged at front end portion of the right leg, wherein the right connecting portion is in a sector shape and pivotally connected to the rear of the main vehicle frame, and the second group of teeth is arranged on the right connecting portion, and the right rear wheel assembly is arranged at the bottom rear portion of the right leg.

Further, the sliding member and the left side frame, and the sliding member and the right side frame are both fit and connected via a tooth meshing transmission structure, and the left side frame and the right side frame are rotated in opposite directions relative to the main vehicle frame when the sliding member slides.

Further, the sliding member and the left side frame, and/or the sliding member and the right side frame are fit and connected via a linkage transmission structure.

Further, the linkage transmission structure comprises a connecting rod, and one end of the connecting rod is pivotally connected with the sliding member, and the other end thereof is pivotally connected with the left side frame/the right side frame.

Further, the forward and backward movement of the operating mechanism drives the driving mechanism to act.

Further, the steering rod comprises a front fork and a handlebar, and the front wheel assembly is arranged at the bottom of the front fork; an upper portion of the front fork and a lower portion of the handlebar are rotatably connected via a universal rotational joint, wherein, the operating mechanism is the handlebar, and a connecting assembly is provided between the handlebar and the sliding member for driving the sliding member to slide forward and backward when the handlebar is rotated relative to the front fork.

Further, the connecting assembly comprises a sleeve rotatably sleeved on the handlebar around an axis line of the handlebar, and a link rod of which one end portion is pivotally connected to the sleeve and the other end portion is pivotally connected to the sliding member.

Further, the seat mechanism is arranged on the main vehicle frame in a manner of being capable of sliding in a front-and-rear direction, and the operating mechanism is the seat mechanism, and the forward and backward movement of the seat mechanism drives the sliding member to move forward and backward.

Further, the seat mechanism and the sliding member are fixedly connected.

Further, the steering rod comprises a front fork and a handlebar, and the front wheel assembly is arranged at the bottom of the front fork; an upper portion of the front fork and a lower portion of the handlebar are rotatably connected via a universal rotational joint; a connecting assembly is provided between the handlebar and the sliding member for driving the sliding member to slide forward and backward when the handlebar is rotated relative to the front fork; the seat mechanism is arranged on the main vehicle frame in a manner of being capable of sliding in a front-and-rear direction, and the operating mechanism is the seat mechanism and the handlebar, and the forward and backward turning of the handlebar and/or the forward and backward movement of the seat mechanism drives the sliding member to move forward and backward.

As a specific implementation, the toy vehicle further comprises a reset device, and the reset device comprises an elastic element for providing an elastic force required for a forward movement of the sliding member relative to the main vehicle frame.

Further, the elastic element is a tension spring, and one end of the tension spring is connected to the front end portion of the sliding member and the other end is connected to the steering rod.

Further, the sliding member is provided with a guide slot extending in the front-and-rear direction, and the main vehicle frame is fixedly provided with a limit block that fits through the guide slot.

Further, the main vehicle frame comprises a main rod extending in the front-and-rear direction, and the sliding member is arranged on the main rod in a sliding fit manner.

Further, the main vehicle frame comprises a rear connecting rod arranged at the rear thereof and extending in a left-and-right direction, the left side frame is pivotally connected to a left end portion of the rear connecting rod, and the right side frame is pivotally connected to a right end portion of the rear connecting rod.

Due to use of the above technical solutions, the present disclosure has following advantages over the conventional art: when using the toy vehicle for children provided by the present disclosure, the user can sit on a seat mechanism and manipulate an operating mechanism to drive a left side frame and a right side frame to rotate relative to a main vehicle frame, so that a left rear wheel assembly and a right rear wheel assembly approach each other or move away from each other, and thus the toy vehicle obtains driving force; children can exercise their limbs while playing the toy vehicle, and this toy vehicle also provides a new style of play, and increases fun of the toy vehicle.

BRIEF DESCRIPTION

Figure 1:
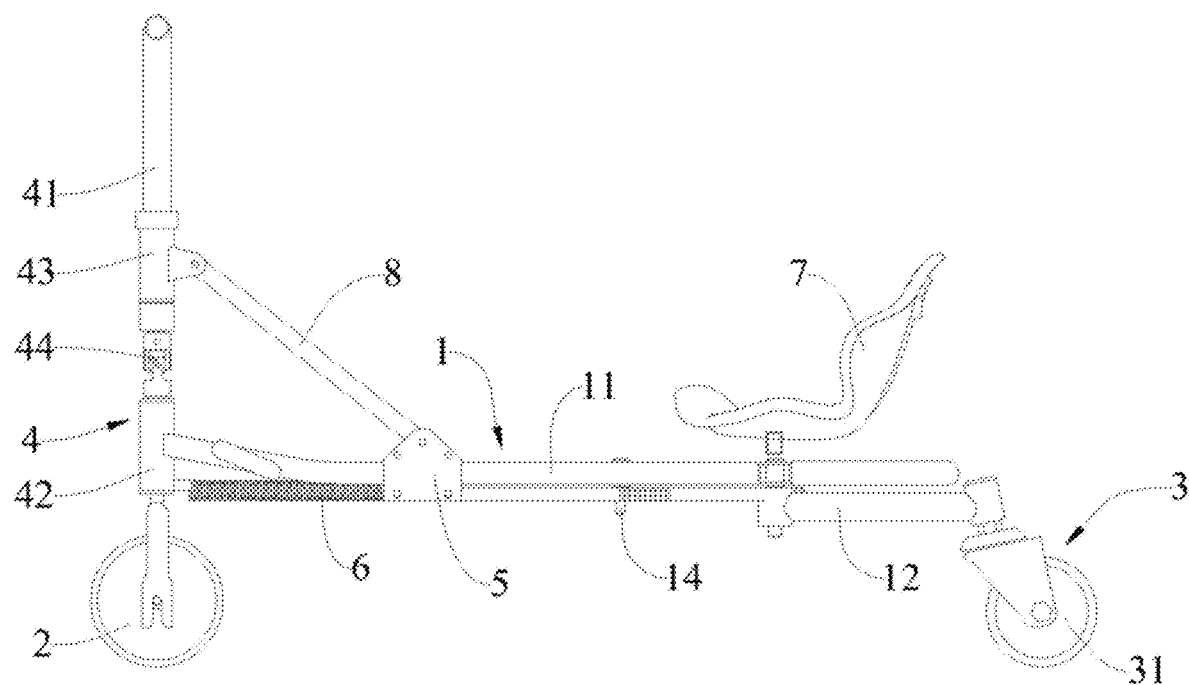
FIG. 1 is a side view of Embodiment 1 of the toy vehicle for children of the present disclosure, at this moment the left side frame and the right side frame is in a close state.

wherein, 1, vehicle frame; 11, main vehicle frame; 111, main rod; 112, rear connecting rod; 12, left side frame; 121, left leg; 122, left connecting portion; 13, right side frame; 131, right leg; 132, right connecting portion; 14, limit block; 15, sliding frame; 2, front wheel assembly; 3, rear wheel assembly; 31, left rear wheel assembly; 32, right rear wheel assembly; 4, steering rod; 41, front fork; 42, handlebar; 43, sleeve; 44, universal rotational joint; 5, sliding member; 51, guide slot; 6, elastic element; 7, seat mechanism; 8, link rod; 101, first group of teeth; 102, second group of teeth; 103, connecting rod.

DETAILED DESCRIPTION

In order to enable those skilled in the art to better understand the solutions of the present disclosure, the technical solutions in the embodiments of the present disclosure are explained clearly and completely below in conjunction with the accompanying drawings, and apparently, the described embodiments are merely a part of the embodiments of the present disclosure, not all the embodiments. Based on the embodiments of the present disclosure, all other embodiments obtained by one of ordinary skill in the art without creative work fall within the protective scope of the present disclosure.

It should be noted that terms "first", "second" and the like in the description, the claims and the accompanying drawings of the present disclosure are used to distinguish similar objects, and do not have to be used to describe a specific order or sequence. It should be understood that the data so used can be interchanged under appropriate circumstances so that the embodiments of the present disclosure described herein can be implemented in an order other than those illustrated or described herein. In addition, the terms "comprise" and "have" and any variations thereof are intended to cover non-exclusive inclusions, for example, processes, methods, devices, products or equipment that include a series of steps or units are not necessarily limited to those clearly listed steps or units, but may include other steps or units not explicitly listed or inherent to these processes, methods, products or equipment.

In the following, the technical solution of the present disclosure is further described combining with the accompanying drawings and specific embodiments.

As shown in FIG. 1 to FIG. 17, a toy vehicle for children of the present disclosure, comprises a vehicle frame 1, a steering rod 4 arranged at the front of the vehicle frame 1 and extending in an up-and-down direction, and a front wheel assembly 2 arranged at the bottom of the steering rod 4, wherein, the vehicle frame 1 comprises a main vehicle frame 11 provided with a seat mechanism 7, a left side frame 12 with a left rear wheel assembly 31 provided at the rear thereof, and a right side frame 13 with a right rear wheel assembly 32 provided at the rear thereof; the left side frame 12 and the right side frame 13 respectively are rotatably connected to the rear of the main vehicle frame 11, and a rear wheel assembly 3 is constituted by the left rear wheel assembly 31 and the right rear wheel assembly 32, and both the left rear wheel assembly 31 and the right rear wheel assembly 32 are universal wheels.

The vehicle frame 1 is further provided with a driving mechanism thereon used for driving the left side frame 12 and the right side frame 13 to rotate respectively relative to the main vehicle frame 11, so that the left rear wheel assembly 31 and the right rear wheel assembly 32 could approach each other or move away from each other, and an operating mechanism used for driving the movement of the driving mechanism. When using the toy vehicle for children of the present disclosure, the user can sit on the seat mechanism 7 and manipulate the operating mechanism to drive the left side frame 12 and the right side frame 13 to rotate relative to the main vehicle frame 11, and the toy vehicle for children is driven forward by the swing of the left rear wheel assembly 31 and the right rear wheel assembly 32.

Specifically, the driving mechanism comprises at least a sliding member 5 arranged on the main vehicle frame 11 in a manner of being capable of sliding in a front-and-rear direction; the user can drive the sliding member 5 to slide in the front-and-rear direction so as to drive the left rear wheel assembly 31 and the right rear wheel assembly 32 to approach each other or to move away from each other, and the toy vehicle could be driven to move forward as the left rear wheel assembly 31 and the right rear wheel assembly 32 relatively approach each other at an accelerated rate.

The sliding member 5 may transfer motion to the left side frame 12 and the right side frame 13 by means of tooth meshing, linkages, or combinations of various mechanisms, preferably use tooth meshing to transmit the motion, because such structure is simpler and a force transmission thereof is more stable and reliable. The sliding member 5 may be connected with both the left side frame 12 and the right side frame 13 via a tooth meshing transmission structure, or may be connected with one of the left side frame 12 and the right side frame 13 via a tooth meshing transmission structure, and the other one is connected with the former via a tooth meshing transmission structure.

As a preferable implementation, the sliding member 5 and the left side frame 12, and the sliding member 5 and the right side frame 13 are both fit and connected via a tooth meshing transmission structure, and the left side frame 12 and the right side frame 13 are rotated in opposite directions relative to the main vehicle frame 11 when the sliding member 5 slides, therefore the sliding of the sliding member 5 can drive the toy vehicle to move forward.

Figure 2:
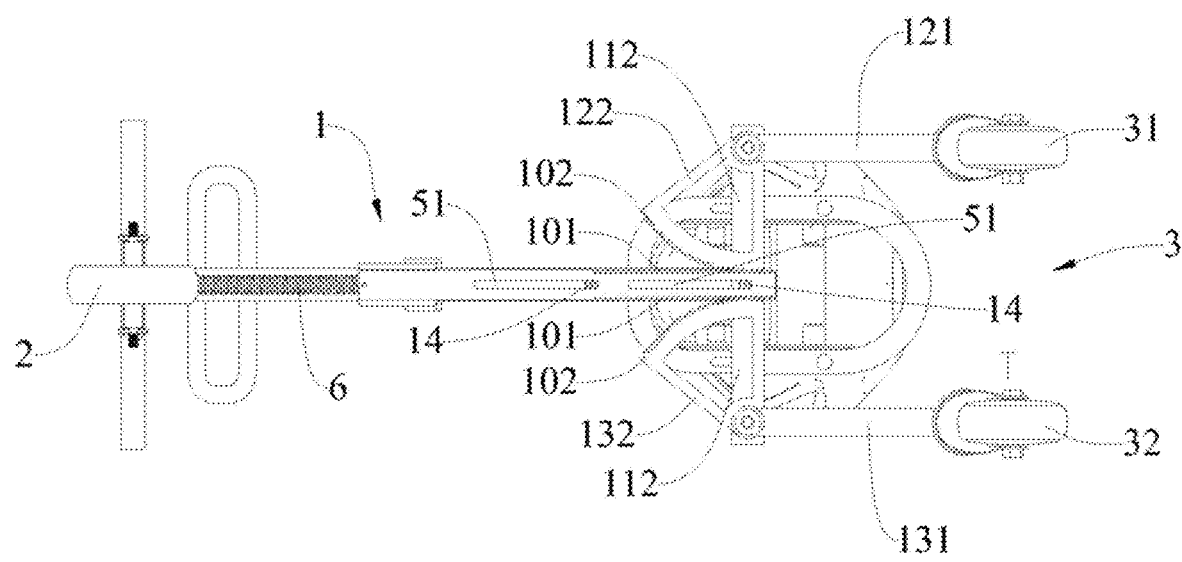
FIG. 2 is a bottom view of Embodiment 1 of the toy vehicle for children of the present disclosure, at this moment the left side frame and the right side frame is in a close state.
Figure 3:
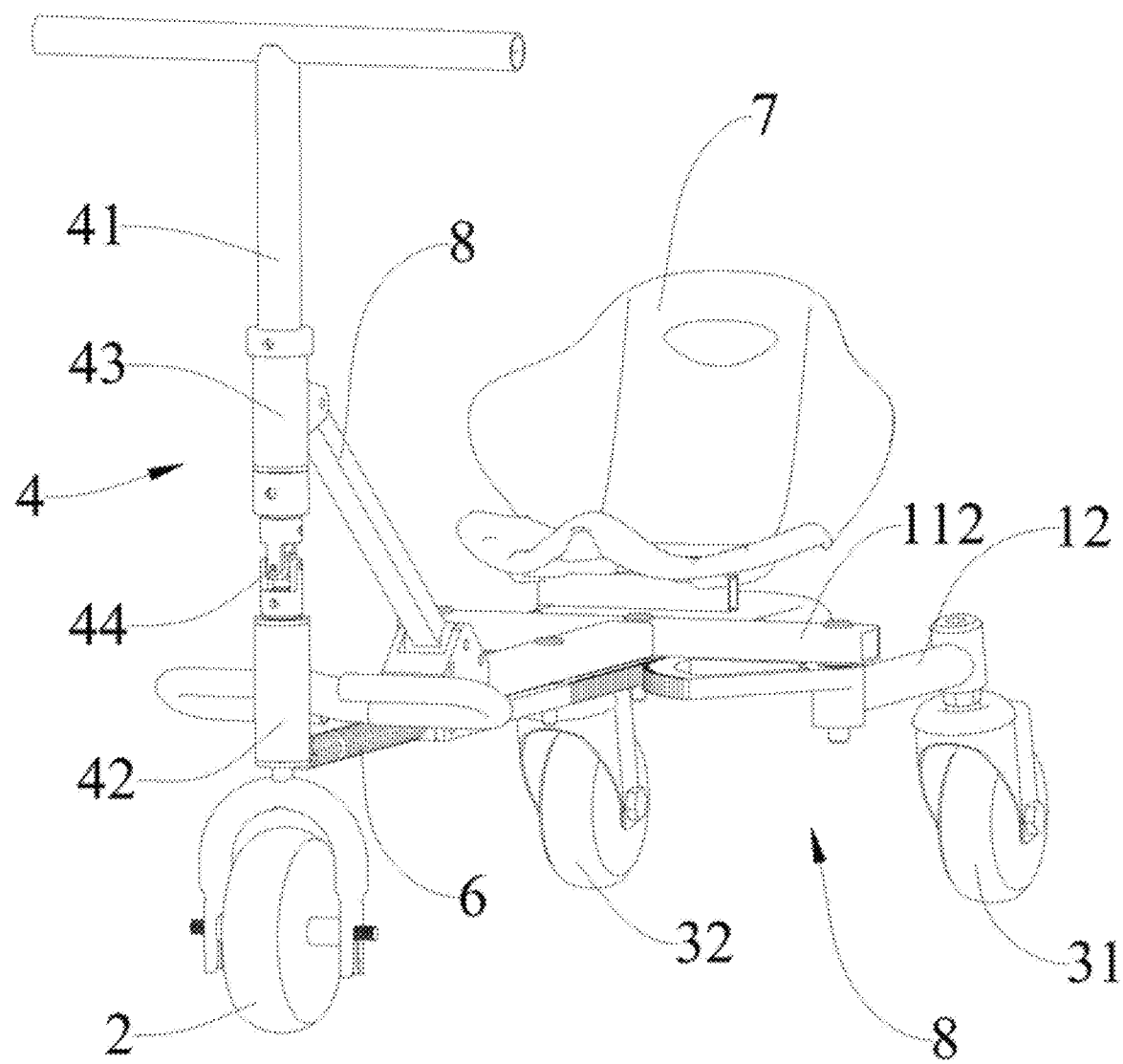
FIG. 3 is an axonometric view of Embodiment 1 of the toy vehicle for children of the present disclosure, at this moment the left side frame and the right side frame is in a close state.
Figure 4:
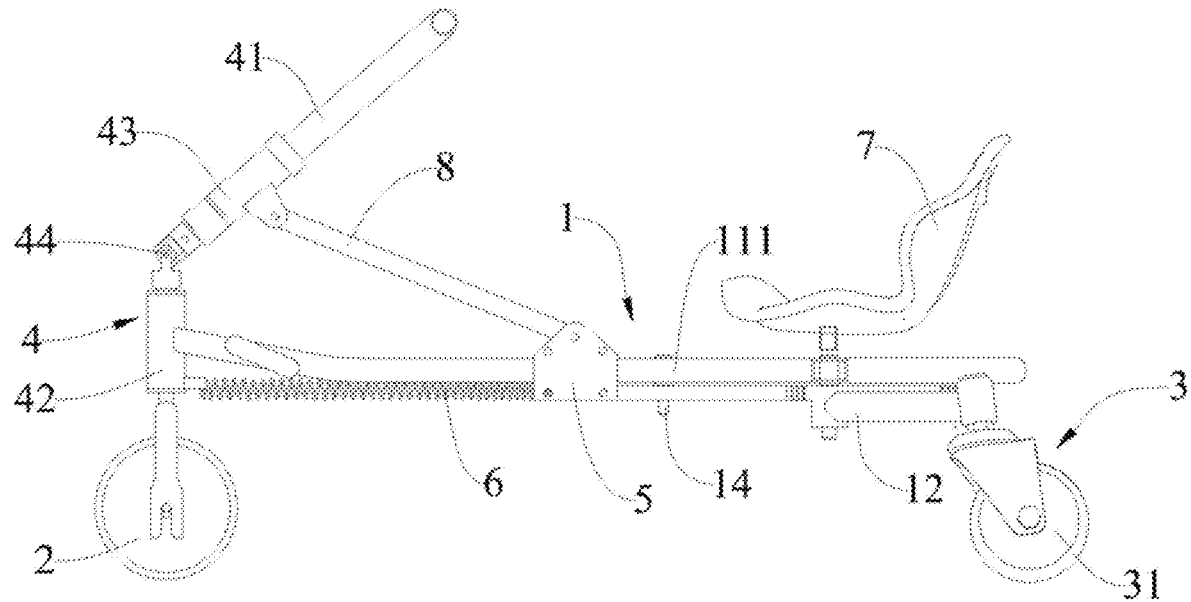
FIG. 4 is a side view of Embodiment 1 of the toy vehicle for children of the present disclosure, at this moment the left side frame and the right side frame is in a separated state.
Figure 5:
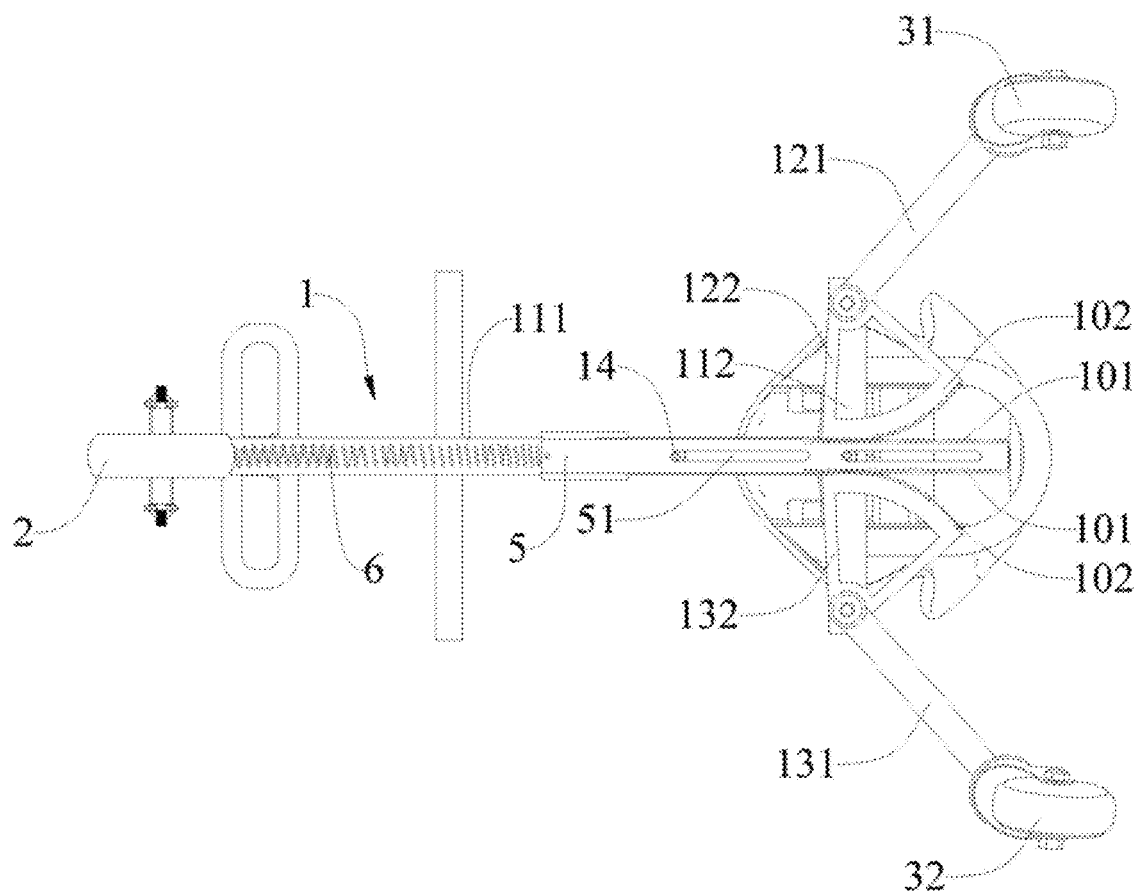
FIG. 5 is a bottom view of Embodiment 1 of the toy vehicle for children of the present disclosure, at this moment the left side frame and the right side frame is in a separated state.
Figure 10:
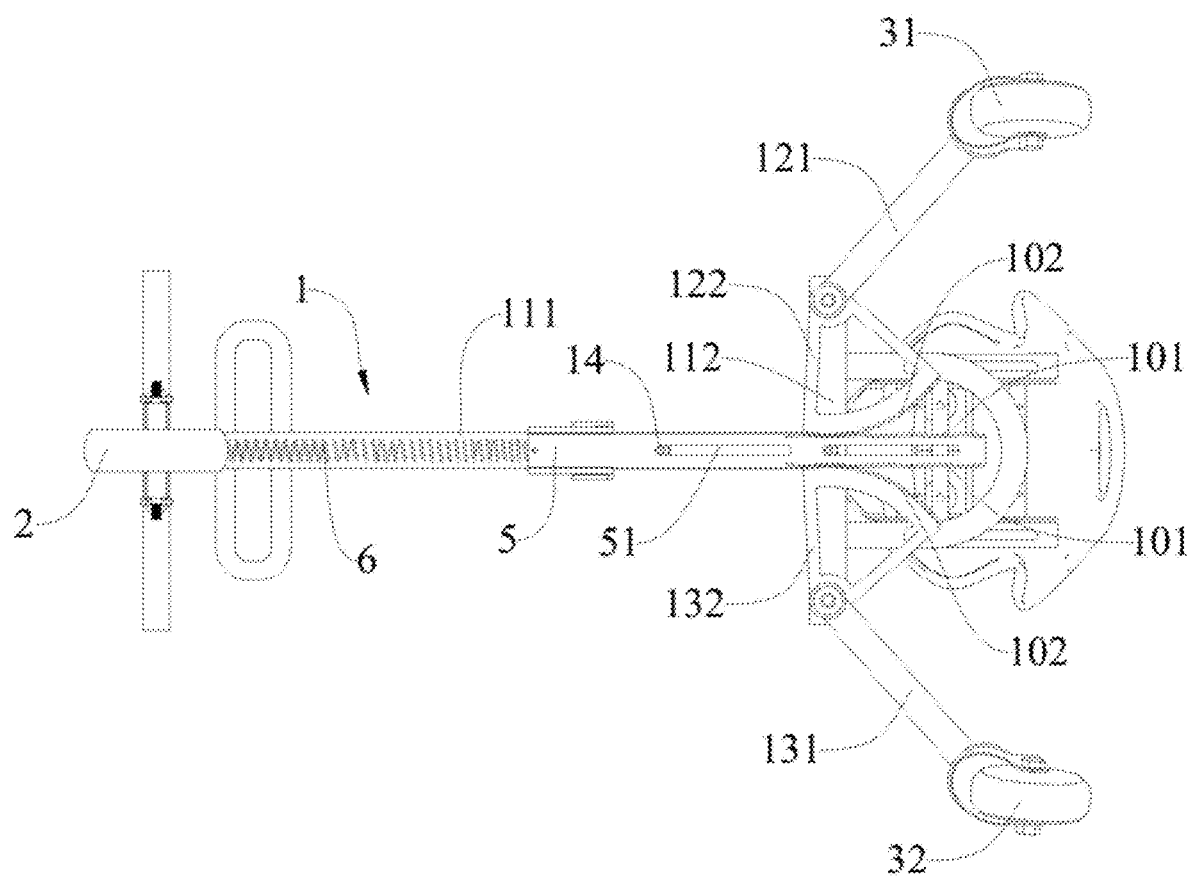
FIG. 10 is a bottom view of Embodiment 2 of the toy vehicle for children of the present disclosure, at this moment the left side frame and the right side frame is in a separated state.
Figure 11:
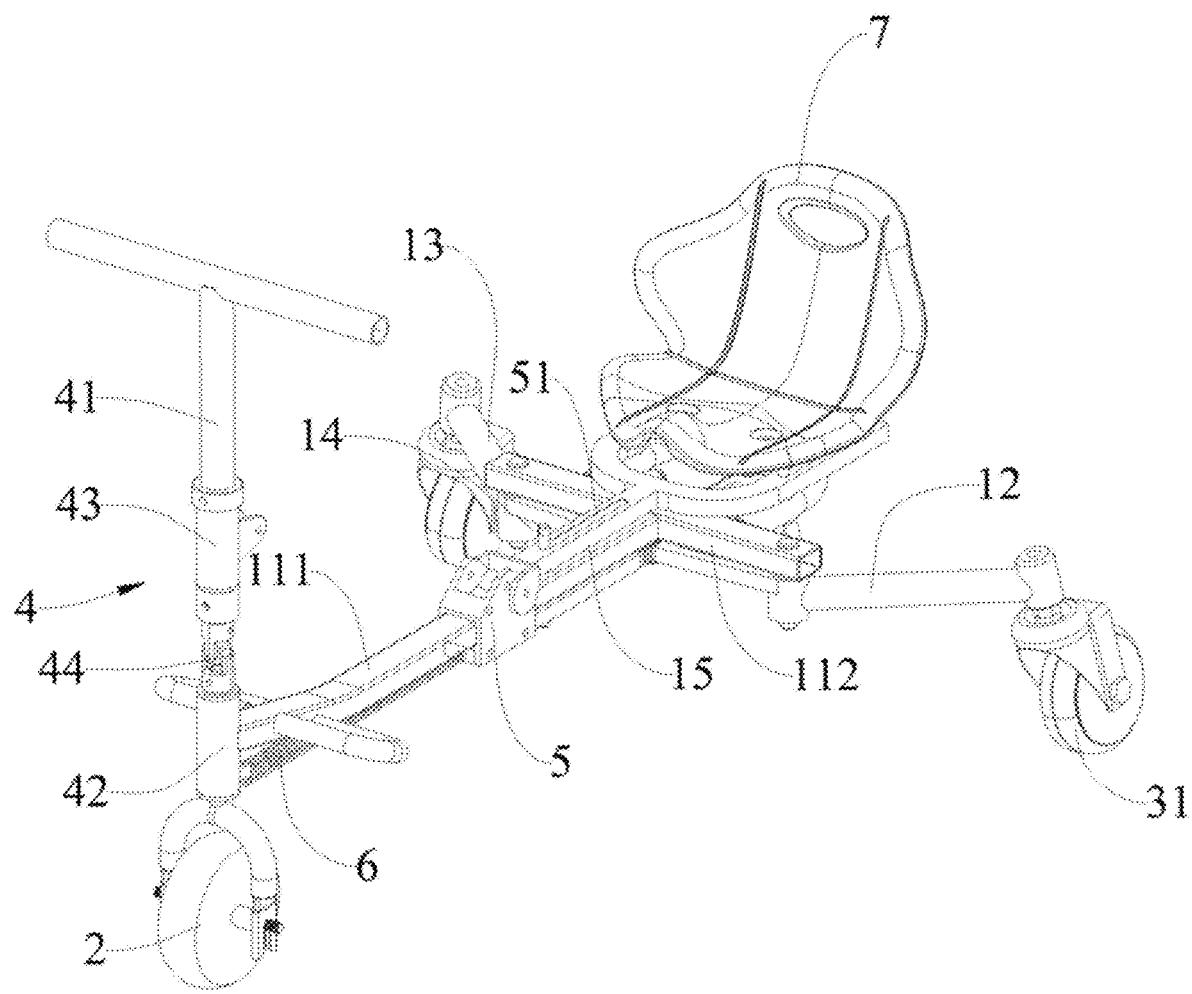
FIG. 11 is an axonometric view of Embodiment 2 of the toy vehicle for children of the present disclosure, at this moment the left side frame and the right side frame is in a separated state.
Figure 13:
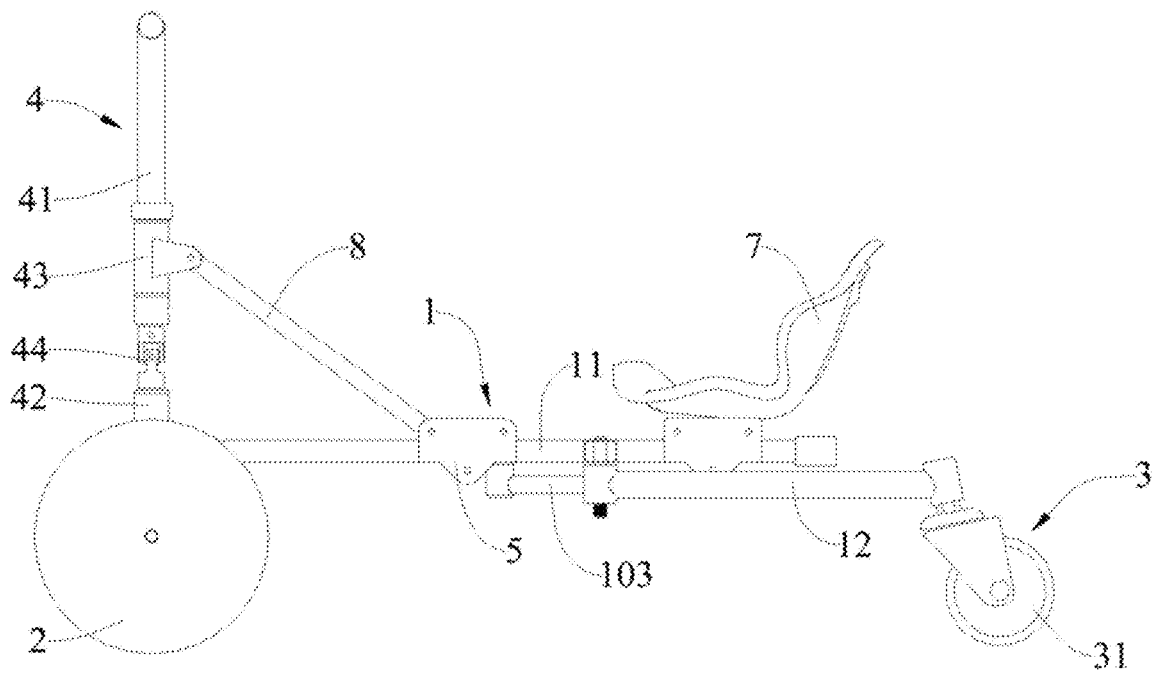
FIG. 13 is a side view of Embodiment 4 of the toy vehicle for children of the present disclosure, at this moment the left side frame and the right side frame is in a close state.
Figure 14:
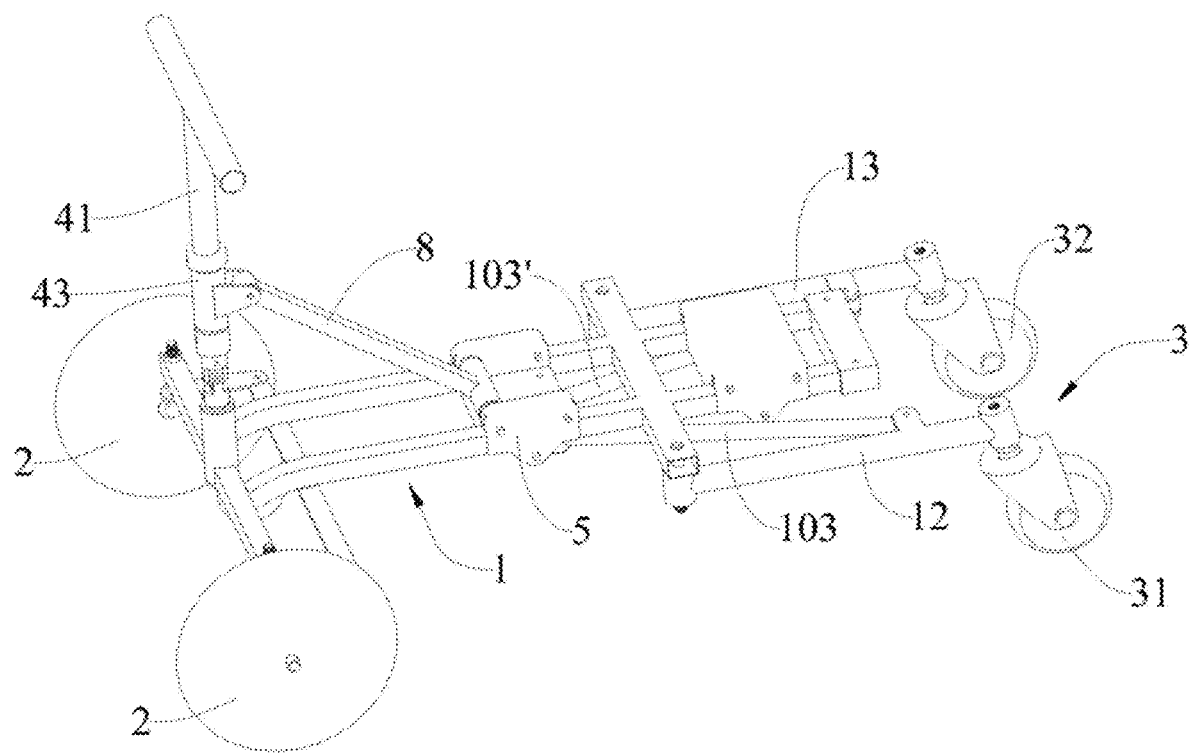
FIG. 14 is an axonometric view of Embodiment 4 of the toy vehicle for children of the present disclosure, at this moment the left side frame and the right side frame is in a close state.

Refer to FIG. 2, FIG. 5 and FIG. 10, the tooth meshing transmission structure comprises a first group of teeth 101 and a second group of teeth 102, and the first group of teeth 101 comprises a plurality of first teeth distributed on the sliding member 5 along the front-and-rear direction; the second group of teeth 102 comprises a plurality of second teeth arranged along a arc line, and the arc line on which all of the second teeth are distributed takes a center line around which the left side frame 12 or the right side frame 13 are rotated relative to the main vehicle frame 11 as a rotatory center line. The first group of teeth 101 and the second group of teeth 102 constitute a gear rack structure, and when the sliding member 5 slides forward and backward, the left side frame 12 and the right side frame 13 are rotated along with it at the same time.

The left side frame 12 and the right side frame 13 are respectively arranged on the left and right sides of the sliding member 5, the front portions of the left side frame 12 and of the right side frame 13 are both provided with the second group of teeth 102, the left and right sides of the sliding member 5 are respectively provided with one first group of teeth 101, and the first group of teeth 101 on each side meshes with the second group of teeth 102 on the corresponding side. When the sliding member 5 slides forward, the left side frame 12 and the right side frame 13 are closed to each other; when the sliding member 5 slides backward, the left side frame 12 and the right side frame 13 are separated.

The left side frame 12 comprises a left leg 121 extending along the front-and-rear direction, and a left connecting portion 122 fixedly arranged at the front end portion of the left leg 121, wherein the left connecting portion 122 is in a sector shape and pivotally connected to the rear of the main vehicle frame 11, and the second group of teeth 102 is arranged on the left connecting portion 122, and the left rear wheel assembly 31 is arranged at the bottom rear portion of the left leg 121. The right side frame 13 comprises a right leg 131 extending along the front-and-rear direction, and a right connecting portion 132 fixedly arranged at the front end portion of the right leg 131, wherein the right connecting portion 132 is in a sector shape and pivotally connected to the rear of the main vehicle frame 11, and the second group of teeth 102 is arranged on the right connecting portion 132, and the right rear wheel assembly 32 is arranged at the bottom rear portion of the right leg 131.

Figure 15:
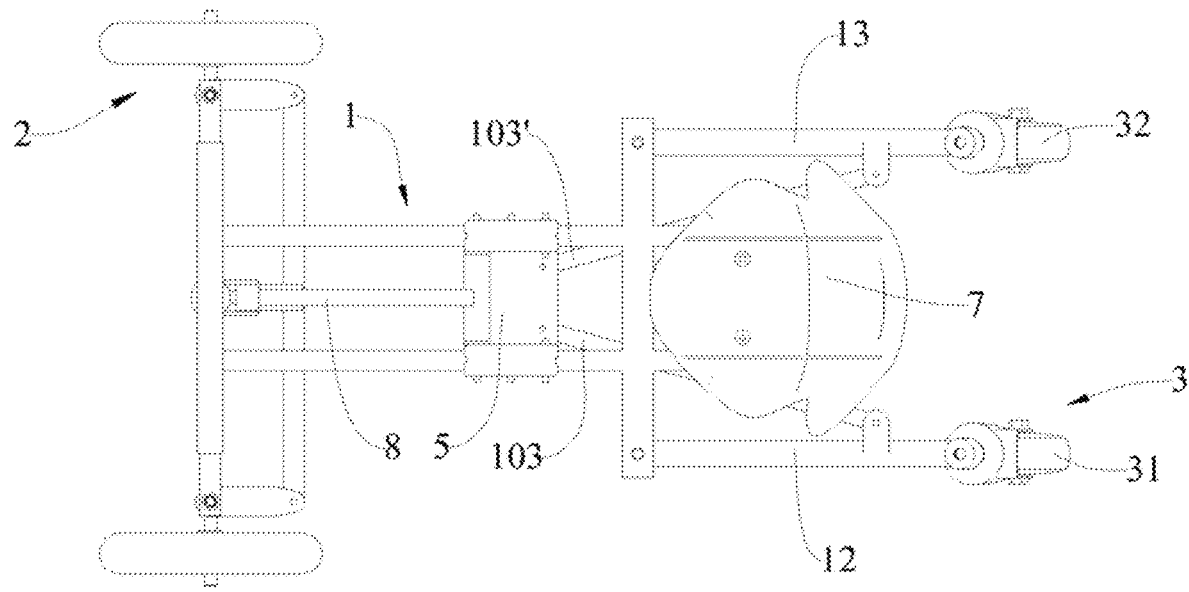
FIG. 15 is a bottom view of Embodiment 4 of the toy vehicle for children of the present disclosure, at this moment the left side frame and the right side frame is in a close state.
Figure 16:
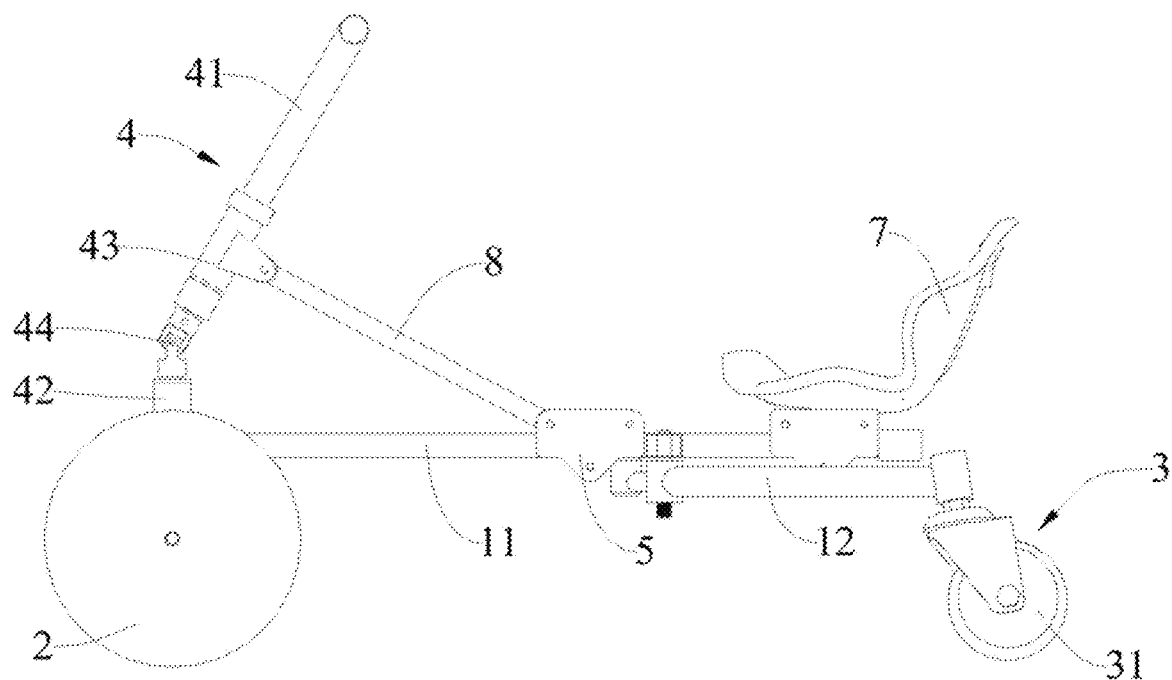
FIG. 16 is a side view of Embodiment 4 of the toy vehicle for children of the present disclosure, at this moment the left side frame and the right side frame is in a separated state.
Figure 17:
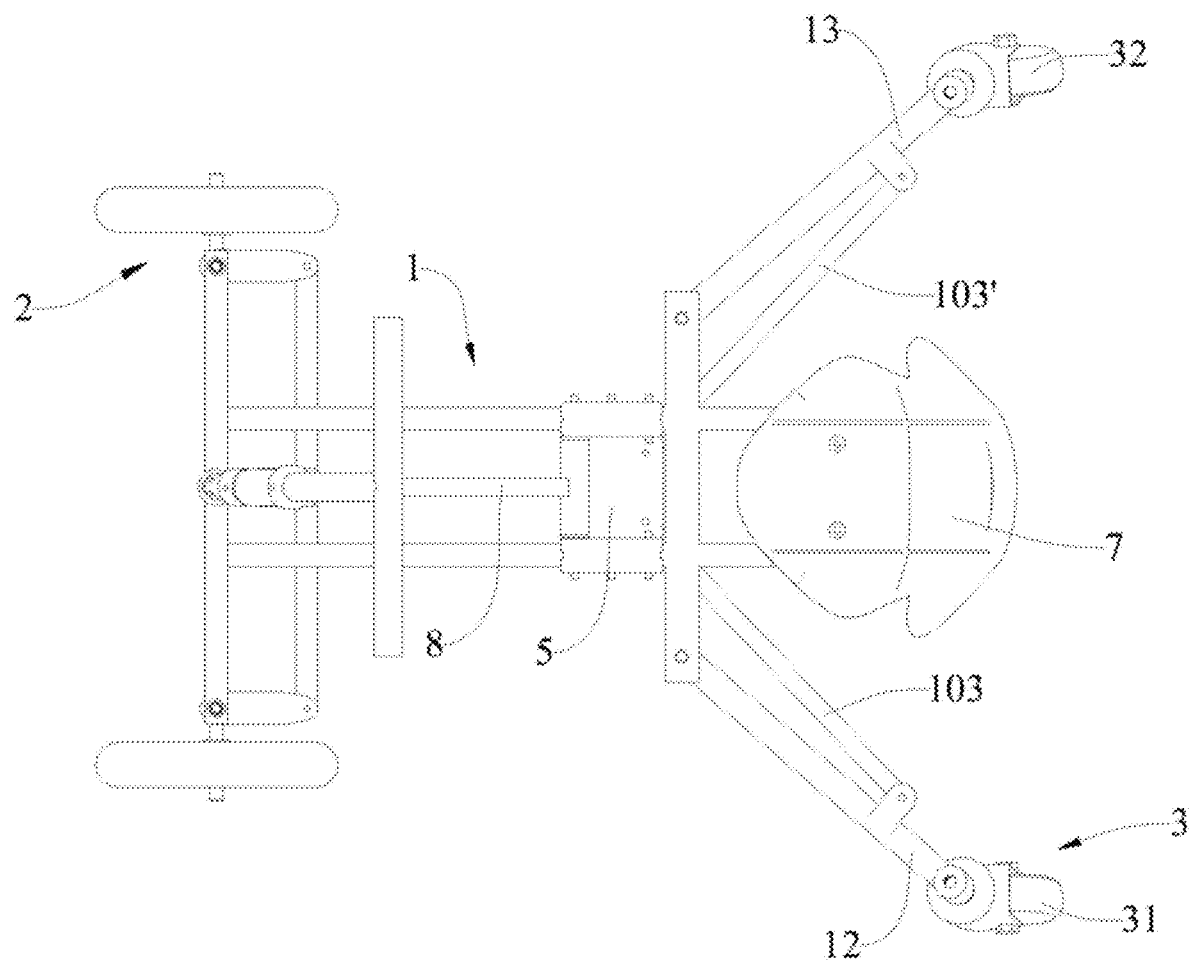
FIG. 17 is a top view of Embodiment 4 of the toy vehicle for children of the present disclosure, at this moment the left side frame and the right side frame is in a separated state.

Refer to FIG. 15 and FIG. 17, another preferable implementation for the transmission from the sliding member 5 to the left side frame 12 and the right side frame 13 is a linkage transmission, wherein the linkage transmission structure comprises two connecting rod 103, 103', and one end of the connecting rod 103 is pivotally connected to the sliding member 5 and the other end is pivotally connected to the left side frame 12, and the sliding member 5, the connecting rod 103, the left side frame 12 and the main vehicle frame 11 form a set of slider-crank mechanism; one end of the connecting rod 103' is pivotally connected to the sliding member 5 and the other end is pivotally connected to the right side frame 13, and the sliding member 5, the connecting rod 103', the right side frame 13 and the main vehicle frame 11 form another set of slider-crank mechanism. When the sliding member 5 slides backward, the left side frame 12 and the right side frame 13 are relatively separated; when the sliding member 5 slides forward, the left side frame 12 and the right side frame 13 are closed to each other.

The toy vehicle for children further comprises a reset device, wherein the reset device comprises an elastic element for providing an elastic force required for a forward movement of the sliding member 5 relative to the main vehicle frame 11, and with the help of the elastic element, it is more labor-saving when the sliding member 5 is manipulated to move forward, so that the left rear wheel assembly 31 and the right rear wheel assembly 32 are more easy to relatively approach each other at an accelerated rate, which provides forward acceleration for the toy vehicle.

Specifically, the elastic element is a tension spring 6, and one end of the tension spring 6 is connected to the front end portion of the sliding member 5 and the other end is connected to the steering rod 4, and when the sliding member 5 slides backward, the tension spring 6 is in a tensioned state.

The sliding member 5 is provided with a guide slot 51 extending in the front-and-rear direction, and the main vehicle frame 11 is fixedly provided with a limit block 14 that fits through the guide slot 51; the guide slot 51 cooperates with the limit block 14 to ensure that the sliding member 5 slides in the front-and-rear direction, and at the same time, the movement range of the sliding member 5 is limited, to prevent the sliding member 5 from falling out of the main vehicle frame 11, and to avoid the damage caused by collision of the sliding member 5 with other parts. Refer to FIG. 2, FIG. 5, and FIG. 10, two guide slots 51 are provided, and two limit blocks 14 are correspondingly provided.

Refer to FIG. 3, FIG. 6, FIG. 8, and FIG. 11, the main vehicle frame 11 comprises a main rod 111 extending in the front-and-rear direction, and the sliding member 5 is arranged on the main rod 111 in a sliding fit manner, therefore the sliding of the sliding member 5 is smooth.

The main vehicle frame 11 further comprises a rear connecting rod 112 arranged at the rear thereof and extending in a left-and-right direction, the left side frame 12 is pivotally connected to a left end portion of the rear connecting rod 112, and the right side frame 13 is pivotally connected to a right end portion of the rear connecting rod 112.

The backward and forward movement of the operating mechanism drives the driving mechanism to act, and there can be a variety of configurations, and these configurations can be combined with the above-mentioned driving mechanisms with different structures to produce multiple implementations. The following is a further explanation in conjunction with the preferred embodiments of the present disclosure.

Embodiment 1

Refer to FIG. 1 to FIG. 6 for Embodiment 1 of the present disclosure, the steering rod 4 comprises a front fork 42 and a handlebar 41, the front wheel assembly 2 is arranged at the bottom of the front fork 42, and an upper portion of the front fork 42 and a lower portion of the handlebar 41 are rotatably connected via a universal rotational joint 44; a connecting assembly is provided between the handlebar 41 and the sliding member 5 for driving the sliding member 5 to slide forward and backward when the handlebar 41 is rotated relative to the front fork 42. Since the front fork 42 and the handlebar 41 rotate in a universal direction, when the front fork 42 and the handlebar 41 extend in different directions, the handlebar 41 can still control the front fork 42 to rotate around its own axis.

The connecting assembly comprises a sleeve 43 rotatably sleeved on the handlebar 41 around the axis line of the handlebar 41, and a link rod 8 of which one end portion is pivotally connected to the sleeve 43 and the other end portion is pivotally connected to the sliding member 5. The handlebar 41, the front fork 42, the link rod 8, the main vehicle frame 11 and the sliding member 5 constitute a slider-crank mechanism, and when the user pulls the handlebar 41 backward, the sliding member 5 slides backward along the main vehicle frame 11, and the left side frame 12 and the right side frame 13 are separated to both sides; when the user pushes the handlebar 41 forward, the sliding member 5 slides forward along the main vehicle frame 11, and the left side frame 12 and the right side frame 13 move closer to each other. The user completely relies on the upper limbs to drive the movement of the toy vehicle, which has a good exercise effect on the upper limbs.

Embodiment 2

Refer to FIG. 7 to FIG. 11 for Embodiment 2 of the present disclosure, the structure of Embodiment 2 is basically the same as that of Embodiment 1, and the main difference is that the structure of the operating mechanism is different. The seat mechanism 7 is arranged on the main vehicle frame 11 in a manner of being capable of sliding in a front-and-rear direction, and the user drives the seat mechanism 7 to move forward and backward which drives the sliding member 5 to move forward and backward. In order to drive the movement of the seat mechanism 7, the user needs to use both hands and feet, and the exercise effect is better.

The main vehicle frame 11 is provided with a sliding frame 15 that can slide in the front-and-rear direction relative to the main vehicle frame 11 and extend in the front-and-rear direction; the sliding frame 15 is fixedly connected to the sliding member 5, and the seat mechanism 7 is fixedly arranged on the sliding frame 15. The sliding frame 15 is also provided with a limit slot 51 thereon, and correspondingly, the main vehicle frame 11 is also fixedly provided with a limit block 14 that fits through the limit slot 51.

In some other embodiments, the seat mechanism 7 may also be connected to the sliding member 5 through other transmission methods, which can enlarge or reduce the transmission ratio between the seat mechanism 7 and the sliding member 5.

In Embodiment 2, since the front fork 42 does not need to drive the sliding member 5 to move backward and forward, the front fork 42 and the handlebar 41 can be integrated; the front fork 42 and the handlebar 41 can also be rotatably connected by a universal rotational joint 44, to improve the flexibility of the toy vehicle.

Embodiment 3

Figure 12:
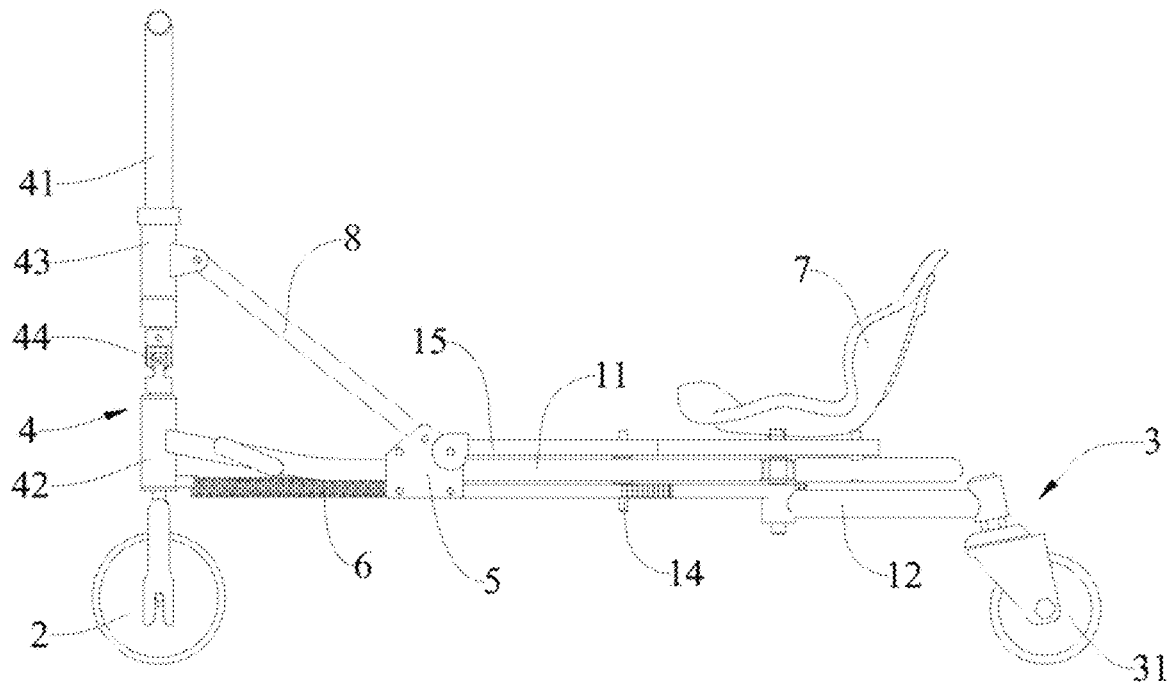
FIG. 12 is a side view of Embodiment 3 of the toy vehicle for children of the present disclosure, at this moment the left side frame and the right side frame is in a close state.
Figure 6:
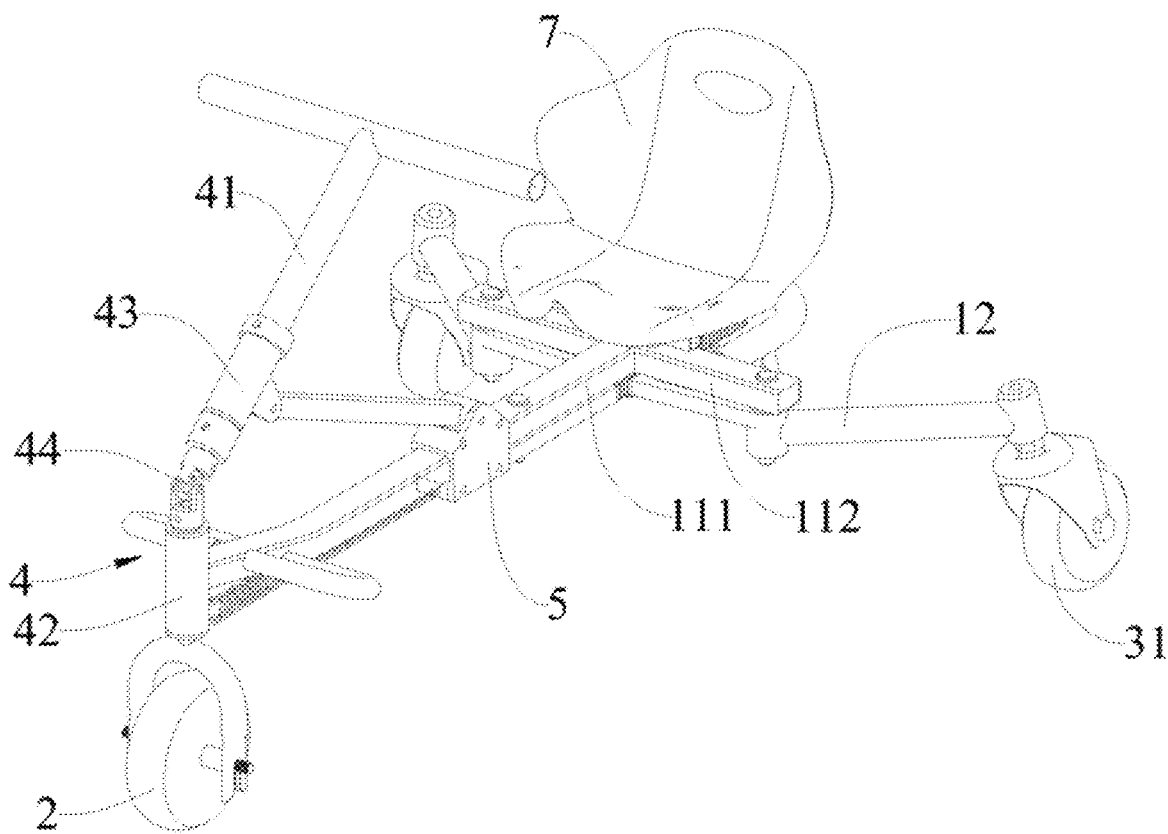
FIG. 6 is an axonometric view of Embodiment 1 of the toy vehicle for children of the present disclosure, at this moment the left side frame and the right side frame is in a separated state.
Figure 7:
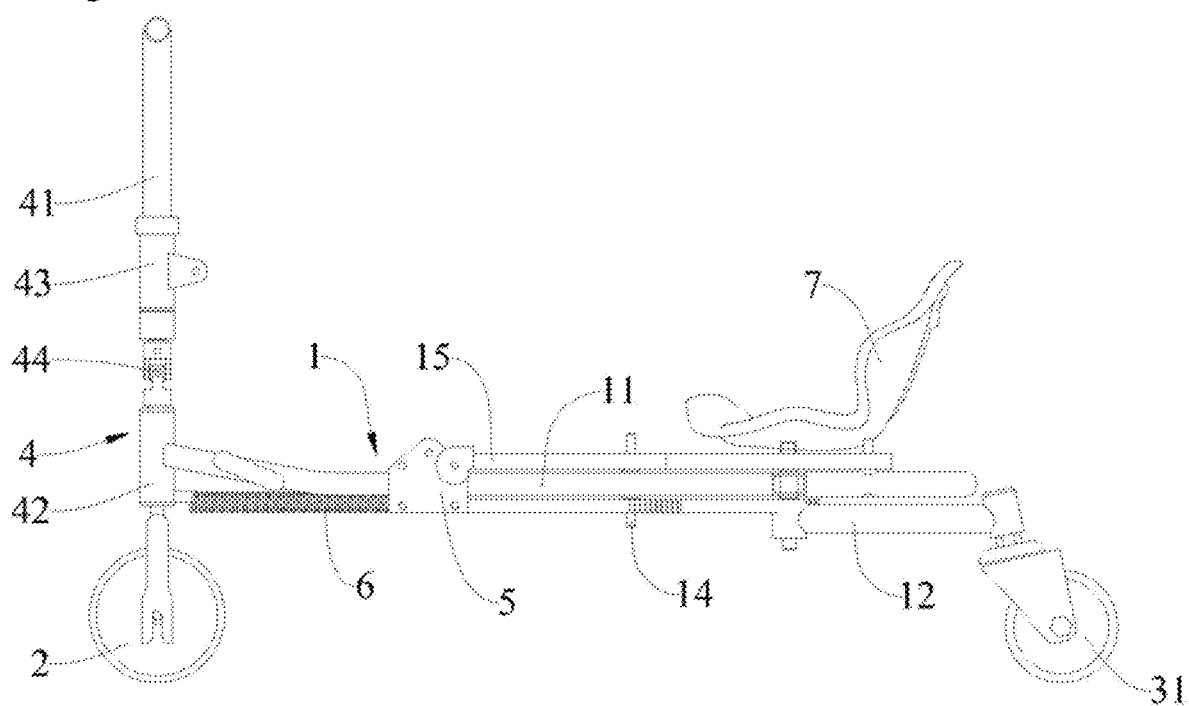
FIG. 7 is a side view of Embodiment 2 of the toy vehicle for children of the present disclosure, at this moment the left side frame and the right side frame is in a close state.
Figure 8:
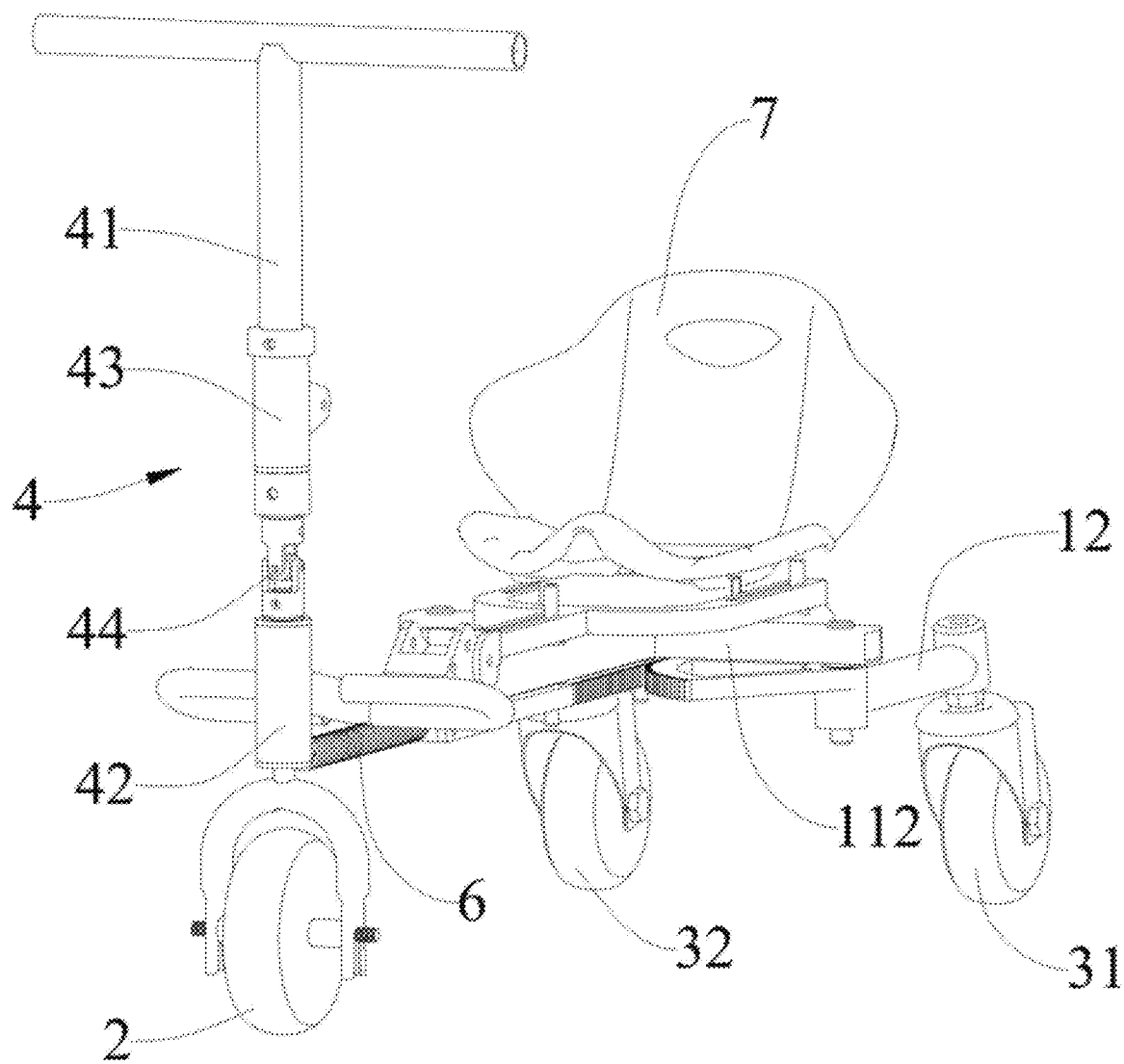
FIG. 8 is an axonometric view of Embodiment 2 of the toy vehicle for children of the present disclosure, at this moment the left side frame and the right side frame is in a close state.
Figure 9:
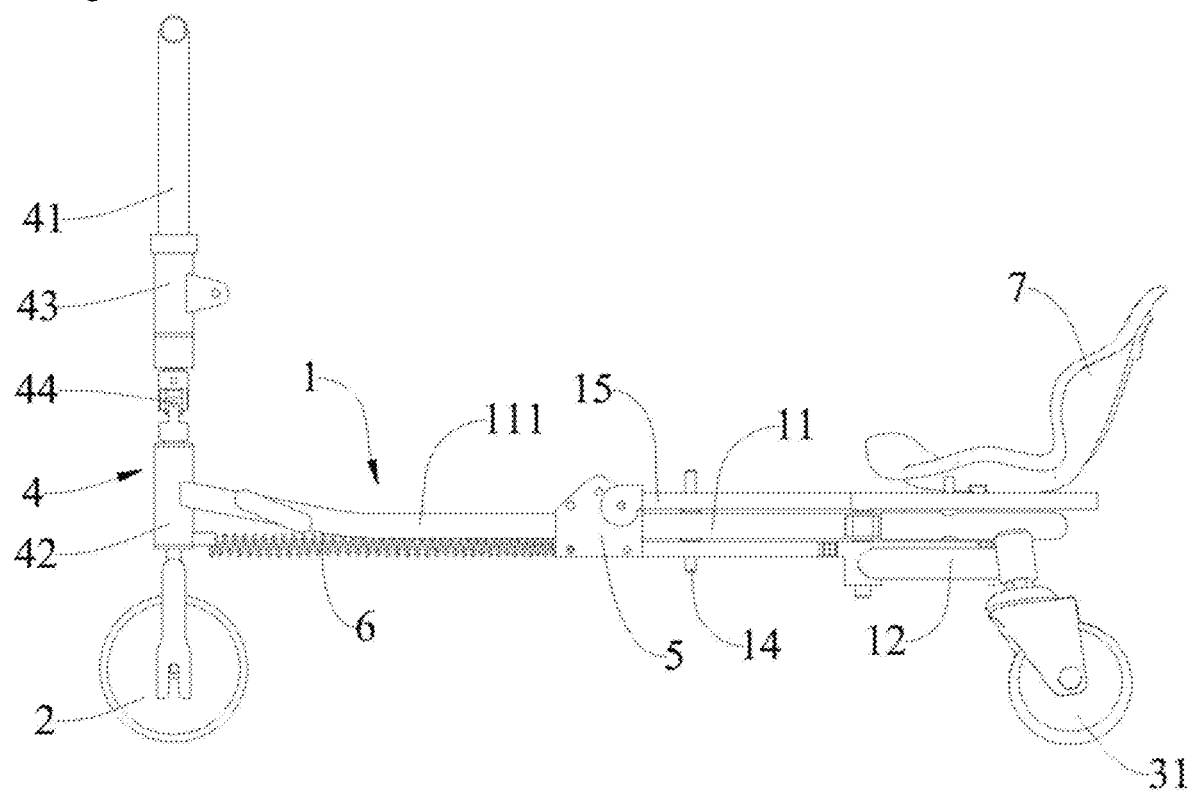
FIG. 9 is a side view of Embodiment 2 of the toy vehicle for children of the present disclosure, at this moment the left side frame and the right side frame is in a separated state.

Refer to FIG. 12 for Embodiment 3 of the present disclosure, the structure of Embodiment 3 is basically the same as that of Embodiment 1, and the main difference is that the seat mechanism 7 can move with the movement of the sliding member 5. Specifically, the main vehicle frame 11 is provided with a sliding frame 15 that can slide in the front-and-rear direction relative to the main vehicle frame 11 and extending in the front-and-rear direction, the sliding frame 15 is fixedly connected to the sliding member 5, and the seat mechanism 7 is fixedly arranged on the sliding frame 15.

When using the toy vehicle for children, the user can drive the toy vehicle to move by manipulating the handlebar 41, or drive the toy vehicle to move by manipulating the seat mechanism 7, or drive the toy vehicle in a combination of the two ways, which provides more ways to play, and can meet the various needs of children.

Embodiment 4

Refer to FIG. 13 to FIG. 17 for Embodiment 4 of the present disclosure, the structure of Embodiment 4 is basically the same as that of Embodiment 1, and the main difference is that the driving mechanism of Embodiment 4 is the linkage transmission structure as described above. The user operates the handlebar 41 to rotate backward and forward to drive the left side frame 12 and the right side frame 13 to move closer to each other and separate, thereby the vehicle for children is driven forward. Specifically, the toy vehicle of Embodiment 4 is provided with two connecting rod 103, 103', one end of the connecting rod 103 is pivotally connected to the sliding member 5 and the other end is pivotally connected to the left side frame 12; the sliding member 5, the connecting rod 103, the left side frame 12 and the main vehicle frame 11 form a set of slider-crank mechanism; one end of the connecting rod 103' is pivotally connected to the sliding member 5 and the other end is pivotally connected to the right side frame 13; the sliding member 5, the connecting rod 103', the right side frame 13 and the main vehicle frame 11 form another set of slider-crank mechanism. When the sliding member 5 slides backward, the left side frame 12 and the right side frame 13 are relatively separated; when the sliding member 5 slides forward, the left side frame 12 and the right side frame 13 are closed to each other.

In summary, when using the toy vehicle for children of the present disclosure, the user can sit on the seat mechanism 7 and manipulate the operating mechanism through the steering rod 4 or the seat mechanism 7 to drive the left side frame 12 and the right side frame 13 to rotate relative to the main vehicle frame 11, so that the left rear wheel assembly 31 and the right rear wheel assembly 32 approach each other or move away from each other, and thus the toy vehicle obtains forward driving force, and the effect of sitting driving is achieved; compared with standing-driven breaststroke vehicle in the conventional art, it provides a new style of play, children can exercise their limbs while playing with the toy vehicle, and the fun of the toy vehicle is increased.

The embodiments described above are only for illustrating the technical concepts and features of the present disclosure, and are intended to make those skilled in the art being able to understand the present disclosure and thereby implement it, and should not be concluded to limit the protective scope of this disclosure. Any equivalent variations or modifications according to the spirit of the present disclosure should be covered by the protective scope of the present disclosure.

For the sake of clarity, it is to be understood that the use of 'a' or 'an' throughout this application does not exclude a plurality, and 'comprising' does not exclude other steps or elements.

The invention claimed is:

1. A toy vehicle for children, comprising a vehicle frame, a steering rod arranged at the front of the vehicle frame and extending in an up-and-down direction, and a front wheel assembly arranged at the bottom of the steering rod, wherein the vehicle frame comprises a main vehicle frame provided with a seat mechanism, a left side frame provided with a left rear wheel assembly at the rear thereof, and a right side frame provided with a right rear wheel assembly at the rear thereof; the left side frame and the right side frame are respectively rotatably connected to the rear of the main vehicle frame, and the left rear wheel assembly and the right rear wheel assembly are both universal wheels;

the vehicle frame is further provided with a driving mechanism, the driving mechanism at least comprises a sliding member arranged on the main vehicle frame to drive the left side frame and the right side frame to rotate respectively relative to the main vehicle frame so that the left rear wheel assembly and the right rear wheel assembly are relatively close to each other or away from each other, and an operating mechanism disposed on at least one of the steering rod and the main vehicle frame and links to the sliding member to mechanically drive the sliding member to slide forward and backward.

2. The toy vehicle for children according to claim 1, wherein the left rear wheel assembly and the right rear wheel assembly are driven to be close to each other or away from each other when the sliding member slides in the front-and-rear direction.

3. The toy vehicle for children according to claim 2, wherein the sliding member and the left side frame are fit and connected via a tooth meshing transmission structure, and/or the sliding member and the right side frame are fit and connected via a tooth meshing transmission structure.

4. The toy vehicle for children according to claim 3, wherein the tooth meshing transmission structure comprises a first group of teeth and a second group of teeth, and the first group of teeth comprises a plurality of first teeth distributed on the sliding member along the front-and-rear direction; the second group of teeth comprises a plurality of second teeth arranged along an arc line, and the arc line on which all of the second teeth are distributed takes a center line around which the left side frame or the right side frame are rotated relative to the main vehicle frame as a rotatory center line;

the left side frame and the right side frame are respectively arranged on the left and right sides of the sliding member; the front portions of the left side frame and of the right side frame are both provided with the second group of teeth, the left and right sides of the sliding member are respectively provided with one first group of teeth, and the first group of teeth on each side meshes with the second group of teeth on corresponding side.

5. The toy vehicle for children according to claim 4, wherein the left side frame comprises a left leg extending along the front-and-rear direction, and a left connecting portion fixedly arranged at front end portion of the left leg, wherein the left connecting portion is in a sector shape and pivotally connected to the rear of the main vehicle frame, and the second group of teeth is arranged on the left connecting portion, and the left rear wheel assembly is arranged at the bottom rear portion of the left leg;

the right side frame comprises a right leg extending along the front-and-rear direction, and a right connecting portion fixedly arranged at front end portion of the right leg, wherein the right connecting portion is in a sector shape and pivotally connected to the rear of the main vehicle frame, and the second group of teeth is arranged on the right connecting portion, and the right rear wheel assembly is arranged at the bottom rear portion of the right leg.

6. The toy vehicle for children according to claim 3, wherein the sliding member and the left side frame, and the sliding member and the right side frame are both fit and connected via a tooth meshing transmission structure, and the left side frame and the right side frame are rotated in opposite directions relative to the main vehicle frame when the sliding member slides.

7. The toy vehicle for children according to claim 2, wherein the sliding member and the left side frame are fit and connected via a linkage transmission structure, and/or the sliding member and the right side frame are fit and connected via a linkage transmission structure.

8. The toy vehicle for children according to claim 7, wherein the linkage transmission structure comprises a connecting rod, and one end of the connecting rod is pivotally connected with the sliding member, and the other end thereof is pivotally connected with the left side frame/the right side frame.

9. The toy vehicle for children according to any one of claim 2, wherein the forward and backward movement of the operating mechanism drives the driving mechanism to act.

10. The toy vehicle for children according to claim 9, wherein the steering rod comprises a front fork and a handlebar, and the front wheel assembly is arranged at the bottom of the front fork; an upper portion of the front fork and a lower portion of the handlebar are rotatably connected via a universal rotational joint, wherein, the operating mechanism is the handlebar, and a connecting assembly is provided between the handlebar and the sliding member for driving the sliding member to slide forward and backward when the handlebar is rotated relative to the front fork.

11. The toy vehicle for children according to claim 10, wherein the connecting assembly comprises a sleeve rotatably sleeved on the handlebar around an axis line of the handlebar, and a link rod of which one end portion is pivotally connected to the sleeve and the other end portion is pivotally connected to the sliding member.

12. The toy vehicle for children according to claim 9, wherein the seat mechanism is arranged on the main vehicle frame in a manner of being capable of sliding in a front-and-rear direction, and the operating mechanism is the seat mechanism, and the forward and backward movement of the seat mechanism drives the sliding member to move forward and backward.

13. The toy vehicle for children according to claim 12, wherein the seat mechanism and the sliding member are fixedly connected.

14. The toy vehicle for children according to claim 9, wherein the steering rod comprises a front fork and a handlebar, and the front wheel assembly is arranged at the bottom of the front fork; an upper portion of the front fork and a lower portion of the handlebar are rotatably connected via a universal rotational joint; a connecting assembly is provided between the handlebar and the sliding member for driving the sliding member to slide forward and backward when the handlebar is rotated relative to the front fork; the seat mechanism is arranged on the main vehicle frame in a manner of being capable of sliding in a front-and-rear direction, and the operating mechanism is the seat mechanism and the handlebar, and the forward and backward turning of the handlebar and/or the forward and backward movement of the seat mechanism drives the sliding member to move forward and backward.

15. The toy vehicle for children according to claim 9, wherein the toy vehicle further comprises a reset device, and the reset device comprises an elastic element for providing an elastic force required for a forward movement of the sliding member relative to the main vehicle frame.

16. The toy vehicle for children according to claim 15, wherein the elastic element is a tension spring, and one end of the tension spring is connected to the front end portion of the sliding member and the other end is connected to the steering rod.

17. The toy vehicle for children according to claim 15, wherein the sliding member is provided with a guide slot extending in the front-and-rear direction, and the main vehicle frame is fixedly provided with a limit block that fits through the guide slot.

18. The toy vehicle for children according to claim 15, wherein the main vehicle frame comprises a main rod extending in the front-and-rear direction, and the sliding member is arranged on the main rod in a sliding fit manner.

19. The toy vehicle for children according to claim 15, wherein the main vehicle frame comprises a rear connecting rod arranged at the rear thereof and extending in a left-and-right direction, the left side frame is pivotally connected to a left end portion of the rear connecting rod, and the right side frame is pivotally connected to a right end portion of the rear connecting rod.

20. A toy vehicle for children, comprising a vehicle frame, a steering rod arranged at the front of the vehicle frame, and a front wheel assembly arranged at the bottom of the steering rod, wherein the vehicle frame comprises a main vehicle frame provided with a seat mechanism, a left side frame provided with a left rear wheel assembly at the rear thereof, and a right side frame provided with a right rear wheel assembly at the rear thereof; the left side frame and the right side frame are respectively rotatably connected to the rear of the main vehicle frame;

the vehicle frame is further provided with a driving mechanism, the driving mechanism at least comprises a sliding member arranged on the main vehicle frame to drive the left side frame and the right side frame to rotate respectively relative to the main vehicle frame so that the left rear wheel assembly and the right rear wheel assembly are relatively close to each other or away from each other, and an operating mechanism disposed on at least one of the steering rod and the main vehicle frame and links to the sliding member to mechanically drive the sliding member to slide forward and backward.

* * * * *